United States Patent [19]

Yamamoto et al.

[11] 3,964,012

[45] June 15, 1976

[54] COLOR DISPLAY SYSTEM IN ULTRASONIC SONAR

[75] Inventors: Takeshi Yamamoto; Keisuke Honda, both of Toyohashi, Japan

[73] Assignee: Keisuke Honda, Japan

[22] Filed: Aug. 6, 1974

[21] Appl. No.: 495,221

[30] Foreign Application Priority Data
Aug. 6, 1973  Japan................................ 48-88142

[52] U.S. Cl................................................. 340/3 C
[51] Int. Cl.²........................ G01S 9/68; G01S 7/56; G01S 9/70
[58] Field of Search............................ 340/3 R, 3 C

[56] References Cited
UNITED STATES PATENTS

| | | | |
|---|---|---|---|
| 3,267,413 | 8/1966 | Beebe et al. ......................... | 340/3 R |
| 3,480,912 | 11/1969 | Speeth et al. ........................ | 340/3 C |
| 3,614,720 | 10/1971 | Ludlum................................ | 340/3 R |

Primary Examiner—Richard A. Farley
Attorney, Agent, or Firm—Burgess, Ryan & Wayne

[57] ABSTRACT

A fish detection sonar is provided wherein a receiver has a display device comprising a rotary disk having a display element mounted thereupon, and a scale disk disposed coaxially of and in opposed relation with the rotary disk; the ultrasonic signal transmitted from a transmitter into the sea is immediately received by the receiver so that the display element may be turned on or energized in response to the level of the received signal, thereby displaying the surface of the sea; and the receiver receives the ultrasonic sound reflected by the targets so that the display element may be turned on in response to the level of the reflected signal; a color display device wherein a plurality of display elements capable of emitting light in different colors when energized are mounted upon the rotary disk, and the ultrasonic signals received by the receiver are divided into a plurality of groups depending upon the levels of the received signals, each level being assigned to each of the display elements, so that the targets such as the surface and bottom of the sea and schools of fish detected may be displayed in different colors.

10 Claims, 15 Drawing Figures

COLOR DISPLAY SYSTEM IN ULTRASONIC SONAR

BACKGROUND OF THE INVENTION

The present invention relates to a color display device for a fish detection sonar capable of displaying the targets such as the surface and bottom of the sea and detected schools of fish in different colors.

One of the display devices widely used in the fish detection sonars is of the so-called "flasher type" comprising a rotary disk driven at a constant rotational speed, a fixed scale disk disposed coaxially of and in opposed relation with the rotary disk, and a display element such as a neon bulb attached upon the rotary disk. The rotation of the rotary disk is synchronized with the emission of ultrasonic pulses by a sonar transducer. That is, the time required for the rotary disk to make one complete rotation is equal to the pulse spacing. A sonar receiver receives the pulses at the instant they are transmitted so that the display element may be turned on to display the surface of the sea. The sonar receiver also receives the echo pulses reflected from the bottom of the sea and the schools of fish in the sea so that the display element may be also turned on to display the bottom and fish. There is a time interval between the displays of the surface and bottom of the sea and the schools of fish that are detected so that the ranges or distances from the sea surface to the bottom and the schools of fish may be detected.

However, the prior art display device of the type described has a distinct defect in that a viewer tends to misinterpret very frequently the targets because the surface and bottom of the sea and schools of fish detected are displayed by monochrome light.

SUMMARY OF THE INVENTION

The primary object of the present invention is therefore to provide a color display device for a fish detection sonar capable of displaying in different colors various targets such as the surface and bottom of the sea and schools of fish detected to avoid the misinterpretation of the targets.

Briefly stated, according to the present invention, a plurality of display elements such as light-emitting diodes capable of emitting light in different colors when energized are mounted upon a rotary disk of the flasher type display device of the type described above and are energized or turned on independently or in combination depending upon the target intensity, the received signals being divided depending upon the target intensity, so that various targets such as the surface and bottom of the sea and detected schools of fish may be displayed in different colors.

BRIEF DESCRIPTION OF THE DRAWINGS

Same reference numerals are used to designate similar parts throughout the figures.

DESCRIPTION OF THE PREFERRED EMBODIMENTS

Figure 1A:
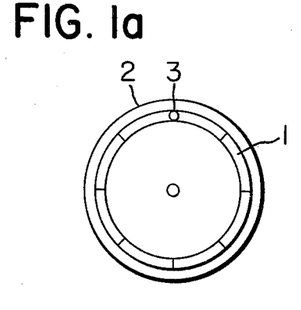
FIG. 1(a) is a front view of a prior art display device.
Figure 1B:
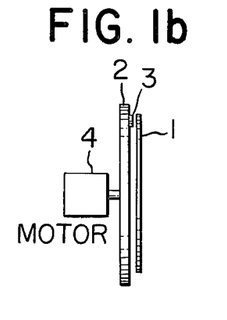
FIG. 1(b) is a side view thereof used together with FIG. 1(a) for the explanation of the underlying principle of the present invention.

Prior Art, FIG. 1

Figure 2:
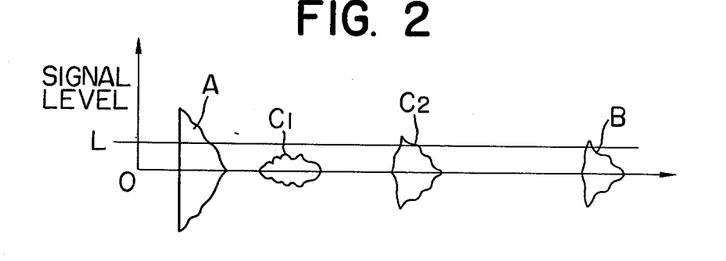
FIG. 2 is a view used also for the explanation of the underlying principle of the present invention.

Prior to the description of the preferred embodiments of the present invention, the prior art display system of the fish detection sonar will be described briefly in order to explain its underlying principle and to specifically point out the defect thereof. The display system comprises, in general, a transparent scale disk 1 with graduated scales marked thereupon, a rotary disk 2, a display element or unit 3 such as a neon bulb, and an electric motor 4 for driving the rotary disk 2. The display element 3 is coupled through a suitable slip ring (not shown) to a sonar transmitter-receiver (not shown). The rotational speed of the rotary disk 2 is so synchronized with the emission of the sonar pulses that it makes one complete rotation per pulse spacing. The sonar pulses reflected from the surface and bottom of the sea and the schools of fish $C_1$ and $C_2$ are received by the sonar receiver so that the signals shown in FIG. 2 are obtained. However, only the signals higher than a predetermined level L in FIG. 2 are applied to the display element 3 from the sonar receiver so that the display element 3 emits light. The angular positions of the display element 3 at which the latter emits light correspond to the ranges to the surface A and bottom B of the sea and the schools $C_1$ and $C_2$ of fish. Therefore, the distances to the bottom B and the schools of fish $C_1$ and $C_2$ may be detected by the use of the scale disk 1.

However, the prior art display system has only one display element 3, the observer tends to very frequently and mistakingly take the bottom B as the school of fish and vice versa. The present invention was made to overcome this problem.

First Embodiment, FIGS. 3, 4, 5 and 6

Figure 4A:
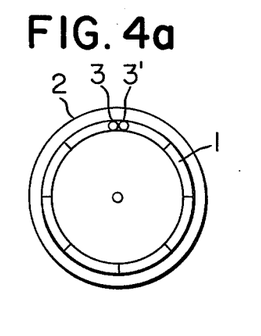
FIG. 4(a) is a front view of the first embodiment.
Figure 4B:
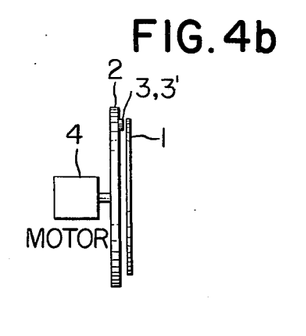
FIG. 4(b) is a side view thereof.

First referring to FIG. 4, the first embodiment of the display device in accordance with the present invention is substantially similar in physical construction to the prior art system shown in FIG. 1 except that two display elements 3 and 3' such as light-emitting diodes are disposed side by side. The display elements 3 emits red light when the target strength is higher than a predetermined level as the outgoing pulse encounters and is reflected by the surface of the sea. The other display unit 3' emits green light when the target strength is that of a school of fish. Thus, the surface of the sea and the school or schools of fish may be displayed by the different lights and may be very clearly distinguished from each other.

The physical components of the display device are the scale disk 1, the rotary disk 2 upon which are mounted the display units 3 and 3' side by side, the motor 4, a magnet mounted upon the undersurface of the rotary disk 2, and a reed switch 6 located in the path of the magnet 5. In the instant embodiment, light-emitting diodes are used as display elements 3 and 3' so that the spacing therebetween may be very small. Therefore, the error in reading through the scale disk 1 of the distance between the surface of the sea and the detected school of fish may be neglibible.

Figure 3:
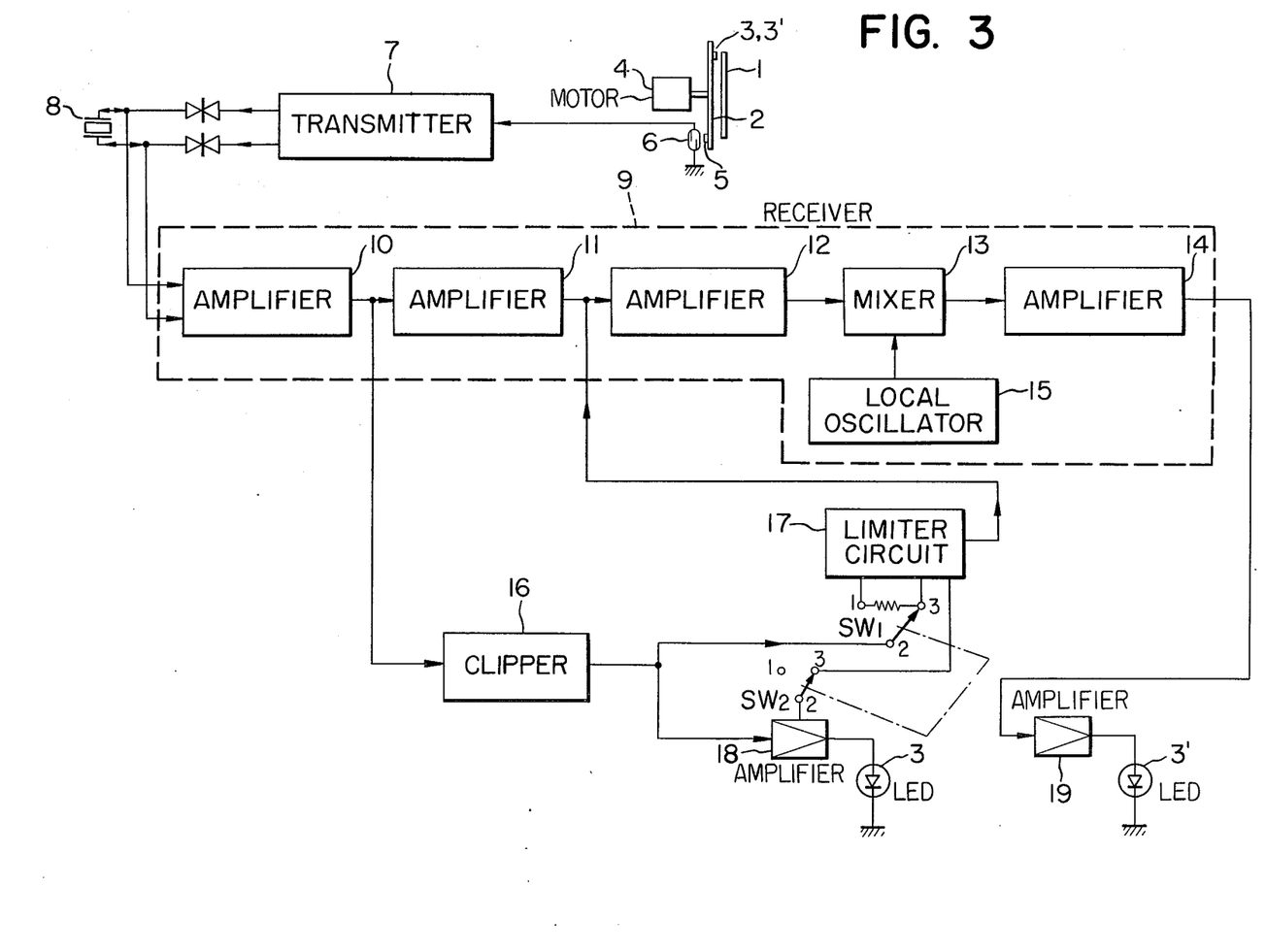
FIG. 3 is a block diagram of an electronic circuit of a first embodiment of a color display device in accord with the present invention.

Next referring to FIG. 3, an electronic circuit of the first embodiment will be described. Whenever the magnet 5 is brought to a position facing the reed switch 6 as the rotary disk 2 rotates, the reed switch is closed to actuate the transmitter 7 so that the sonar pulse is transmitted from the transducer 8. The sonar pulses reflected from the targets are received also by the transducer 8 so that the electrical signals are applied to a first-stage amplifier 10 in a sonar receiver generally indicated by 9. The output signals of the amplifier 10 are applied to a second-stage amplifier 11 and to a clipper 16. The clipper 16 is adapted to pass therethrough only those signal components having an amplitude higher than a predetermined level as will be described in detail with reference to FIG. 5 hereinafter. The output of the clipper 16 is amplified by an amplifier 18 and applied to the display element of light-emitting diode 3 so that the latter emits red light. Thus, the angular position of the light-emitting diode 3 at which the latter emits red light corresponds to the surface of the sea.

The output of the clipper 16 is also applied to a limiter 17 to be described in detail hereinafter with reference to FIG. 7, and the output of the limiter 17 is applied to a third-stage amplifier 12, so that those signal components with a high target intensity which passed through the clipper 16 and represent the target or surface of the sea are suppressed while only the signals representing the target with a weak target intensity are applied to a mixer 13 to which is also applied the output of a local oscillator 15. The output of the mixer 13 is amplified by an amplifier 14 and an amplifier 19 and applied to the light-emitting diode 3'. Therefore, the diode 3' emits green light, and the angular position at which the light-emitting diode 3' emits green light corresponds to the position of the bottom of the sea B or the school $C_1$ or $C_2$ of fish.

In addition to the above components, the electronic circuit further includes a selection switch $SW_1$ for the limiter 17 and the amplifier 18 and a power source selection switch $SW_2$.

Figure 5:
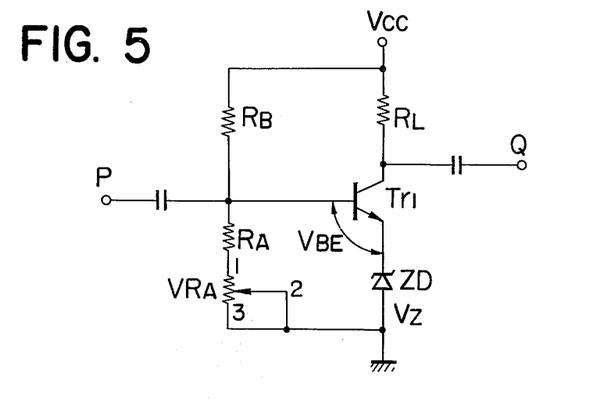
FIG. 5 is a detailed diagram of a clipper shown in FIG. 3, at 16.

Next referring to FIG. 5, the clipper 16 will be described in detail hereinafter. The clipper 16 comprises, in general, a transistor $Tr_1$, a zener diode ZD, a load resistor $R_L$, a bias resistor $R_B$, and a series-connected resistor circuit consisting of a fixed resistor $R_A$ and a variable resistor $VR_A$. The clipper 16 is so arranged that the transistor $Tr_1$ is turned on when the following relation is satisfied:

$$V_{BE} + V_z \leq V_A$$

but when $$V_{BE} + V_z > V_A$$

it is turned off, where
$V_z$ = zener voltage of the zener diode ZD;
$V_{BE}$ = base-emitter voltage of the transistor $Tr_1$; and
$V_A$ = voltage across the resistors $R_A$ and $VR_A$.

In other words, when no input signal appears at an input terminal P, $V_{BE} + V_z > V_A$, but when an input signal having an amplitude higher than a predetermined level appears at the input terminal P, $V_{BE} + V_z \leq V_A$ so that an output signal appears at an output terminal Q. Even when an input signal lower than a predetermined level appears at the input terminal P, the relation $V_{BE} + V_z > V_A$ remains unchanged so that no output signal appears at the output terminal Q. The level of the output signal appearing at the output terminal Q may be suitably adjusted by the adjustment of the resistance of the variable resistor $VR_A$. That is, when the resistance between one fixed terminal 1 and a wiper arm 2 is less, an output will not appear at the output terminal Q unless the level of the input signal is relatively high, but when the resistance is high, the output signal will immediately appear at the output terminal Q even when the level of the input signal is relatively low.

Figure 6:
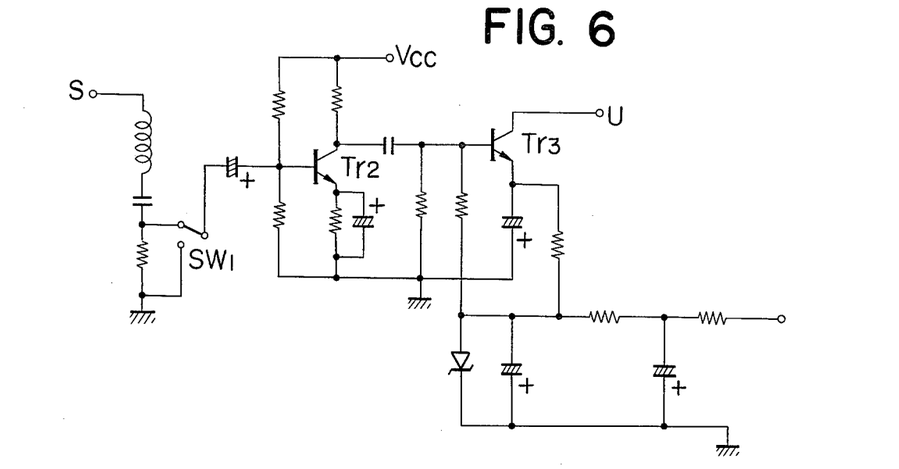
FIG. 6 is a detailed diagram of a limiter shown in FIG. 3, at 17.

Next the limiter 17 will be described in detail hereinafter with reference to FIG. 6. The input signal, that is, the output signal of the clipper 16 is applied to an input terminal S, and is amplified by a first transistor $Tr_2$, the output of which is applied to a second transistor $Tr_3$ whose collector terminal U is connected to the input terminal of the amplifier 12 in the receiver 9 (see FIG. 3). When no input signal appears at the input terminal S, a positive potential is normally impressed upon the collector of the second transistor $Tr_3$. When the input signal is applied to the transistor $Tr_3$, it conducts so that the collector potential drops. Consequently, the bias voltage of the third-stage amplifier 12 drops to a cutoff point so that the high-level or high target intensity signals, that is the output signals of the clipper 16, are suppressed while the low-level signals are amplified and applied to the mixer 13 in the next stage.

Figure 7:
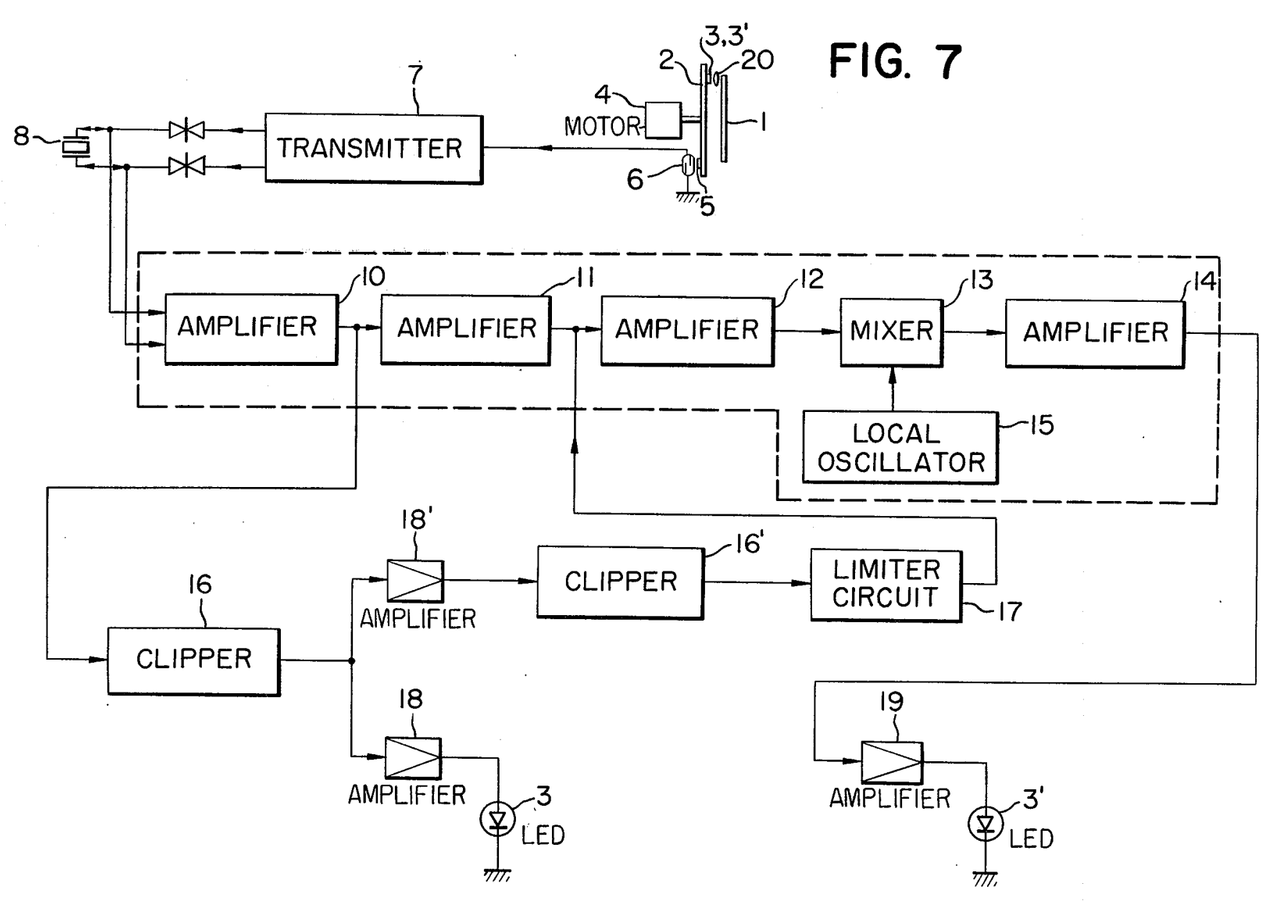
FIG. 7 is a block diagram of an electronic circuit of a second embodiment of the present invention.
Figure 8A:
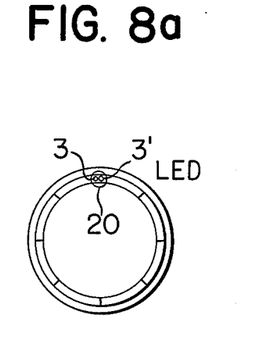
FIG. 8(a) is a front view of the second embodiment.
Figure 8B:
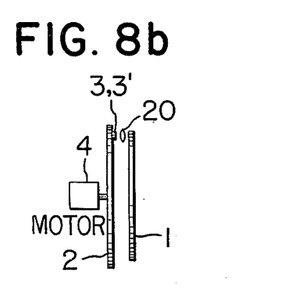
FIG. 8(b) is a side view thereof.
Figure 9:
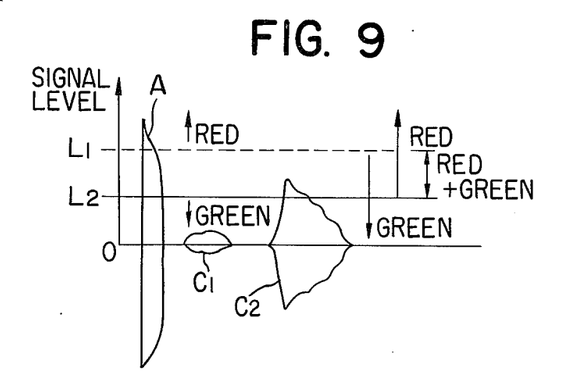
FIG. 9 is a view used for the explanation of the second embodiment.

Second Embodiment, FIGS. 7, 8, and 9

The second embodiment of the present invention to be described in detail hereinafter has a special feature, that in response to an intermediate-level or target strength signals, that is the signals whose level is between the high-level or high-target-intensity signals which cause the light-emitting diode 3 to emit red light and the low-level or the low-target-intensity signals which cause the light-emitting diode 3' to emit green light, both the red and green light-emitting diodes 3 and 3' are energized to emit red and green light so that light in additive color thereof may be observed through a lens 20 located in front of the light-emitting diodes 3 and 3' as shown in FIG. 8. More particularly, when the level of the input signal is higher than a predetermined level $L_2$ shown in FIG. 9, the red light-emitting diode 3 is energized, but when the level is lower than a predetermined level $L_1$, the green light-emitting diode 3' is energized. Therefore, when the level of the input signals is between the higher and lower predetermined levels $L_1$ and $L_2$, both the red and green light-emitting diodes 3 and 3' emit light so that the additive color may be seen through the lens 20. However, when the level is higher than the higher level $L_1$, only the light-emitting diode 3 emits red light. When the level is lower than the lower predetermined level $L_2$, only the light-emitting diode 3' emits green light.

The electronic circuit of the second embodiment shown in FIG. 7 is substantially similar in construction to that of the first embodiment except that an additional amplifier 18' and an additional clipper 16' are inserted between the clipper 16 and the limiter 17. Therefore, only the signal passing through both the clipper 16, 16' is applied to limiter 17.

Like the first embodiment, the output signal of the clipper 16, which is amplified by the amplifier 18, turns on the red light-emitting diode 3. In other words, the level of the output signal of the clipper 16 is higher than the lower predetermined or reference level $L_2$ shown in FIG. 9.

The output signal of the clipper 16 is also applied through the amplifier 18' to the (second) clipper 16' which passes only the signal whose level is higher than a higher predetermined or reference level $L_1$. The output signal of the second clipper 16' is applied through the limiter 17 to the third-stage amplifier 12 in the receiver 9 so that of the output signals of the second-stage amplifier 11 the signals whose level is higher than the higher reference level $L_1$ are cut off. Therefore, the signal whose level is higher than the higher reference level $L_1$ turns on only the red light-emitting diode 3. The signal whose level is higher than the lower reference level $L_2$ but is lower than the higher reference level $L_1$ (see FIG. 4, $C_2$) cannot pass through the second clipper 16'. Therefore, of the output signals of the second stage amplifier 11, the signals whose level is lower than the higher reference level $L_1$ but is higher than the reference level $L_2$ pass through the third-stage amplifier 12 so that the green light-emitting diode 3' is turned on. The signals whose level is lower than the lower reference level $L_2$ (see FIG. 9, $C_1$) cannot pass through the first clipper 16 so that only the green-light emitting diode 3' is turned on, or energized, as with the case of the first embodiment. Thus, the third embodiment of the present invention may display the targets in three colors, that is, red, green and additive color thereof depending upon the target intensity.

Figure 10:
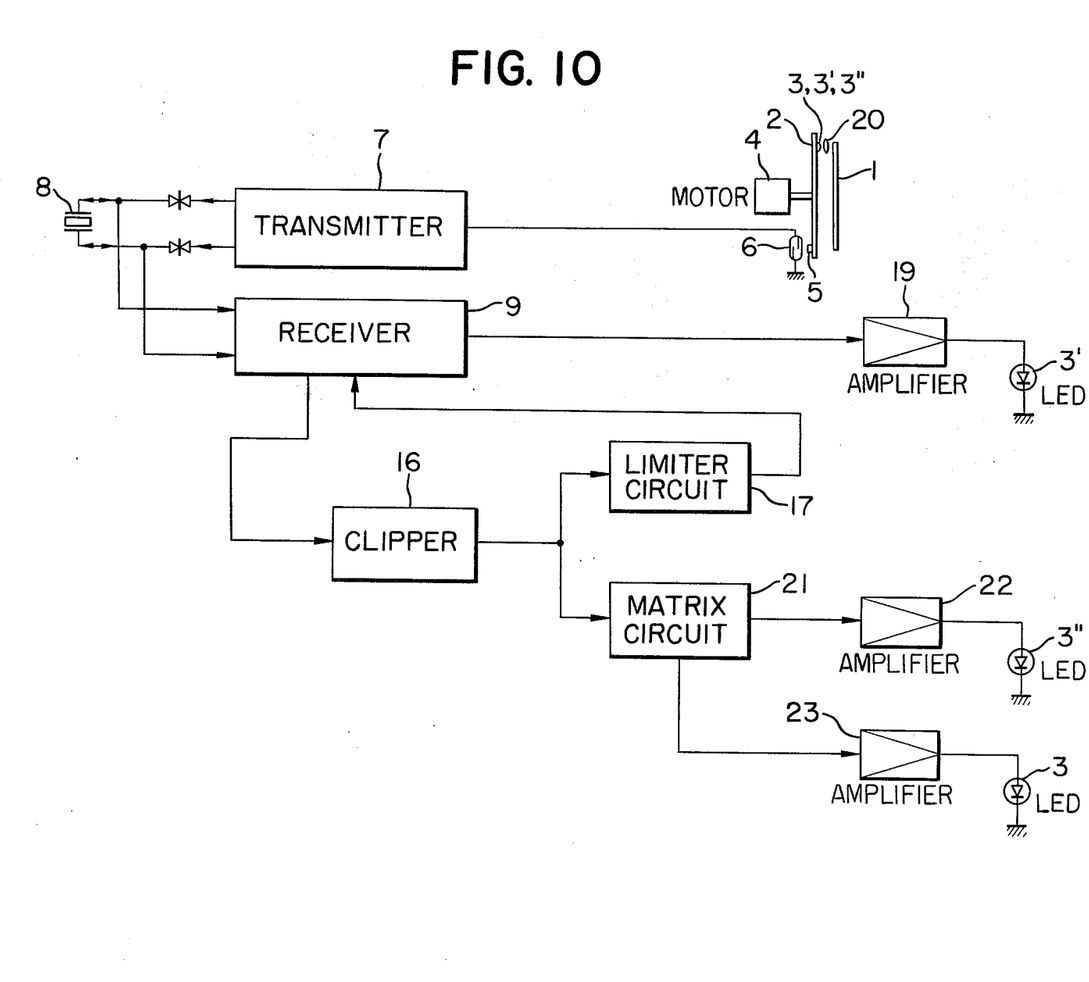
FIG. 10 is a block diagram of an electronic circuit of a third embodiment of the present invention.

Third Embodiment, FIG. 10

Figure 11:
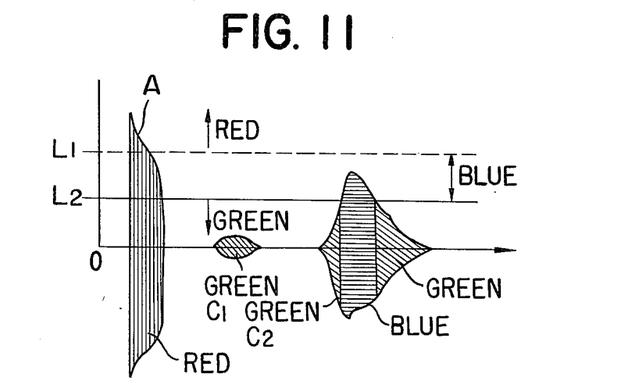
FIG. 11 is a view used for the explanation thereof.

According to the third embodiment of the present invention, three red, blue and green light-emitting diodes 3, 3'', and 3' are turned on depending upon the levels of the received signals or target intensity, as shown in FIG. 11. The electronic circuit of the third embodiment is substantially similar in construction to the second embodiment except as to be described hereinafter.

The clipper 16 is so arranged as to pass only the signal higher than a reference level $L_2$ shown in FIG. 11 so that the green-light-emitting diode 3' is turned on in response to the signals lower than the reference level $L_2$ in a manner substantially similar to that described hereinbefore with reference to the first and second embodiments. That is, the green-light-emitting diode 3' is turned on in response to the signals reflected from the school $C_1$ of fish shown in FIG. 11.

The output of the clipper 16 is also applied to a matrix circuit 21 so that signals higher than a reference level $L_1$ shown in FIG. 11, that is signals representing the target A are applied through an amplifier 23 to the red light-emitting diode 3 while the signals higher than the reference level $L_2$ but lower than the reference level $L_1$ are applied through an amplifier 22 to the blue-light-emitting diode 3''. Matrix circuit 21 is constructed in the same manner as the amplifier, limiter, and clipper circuits shown in FIGS. 3 and 7. Therefore, the target A is displayed by the red light while the target $C_2$, by the blue light.

Figure 12:
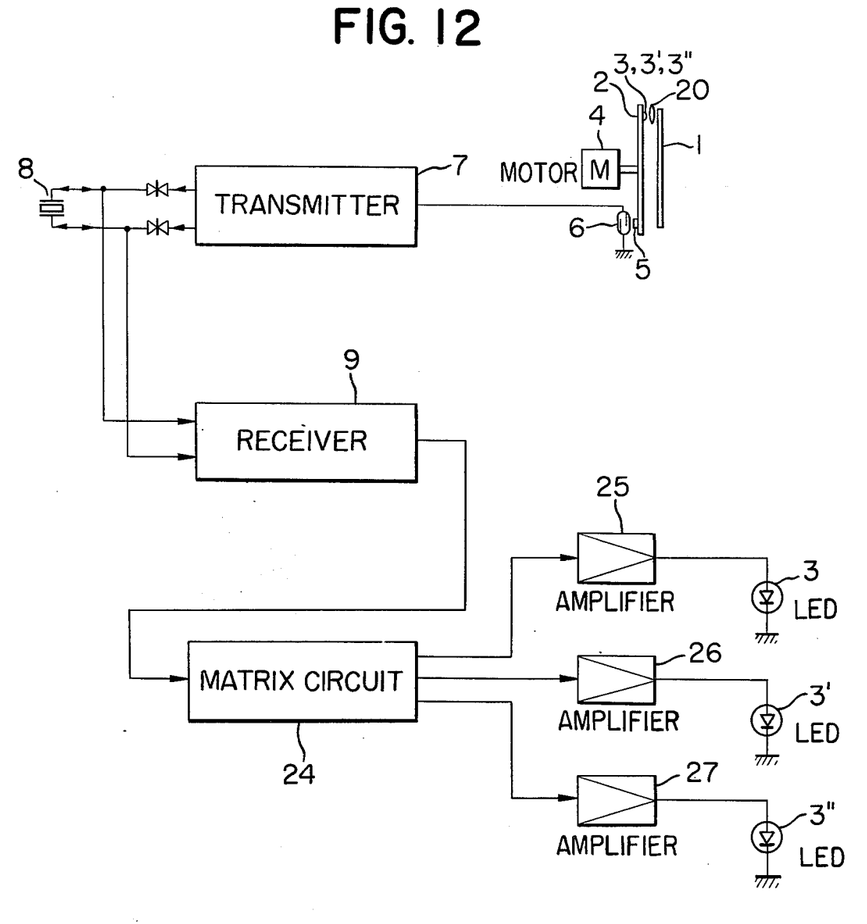
FIG. 12 is a block diagram of an electronic circuit of a fourth embodiment of the present invention.

Fourth Embodiment, FIG. 12

The fourth embodiment shown in FIG. 12 is substantially similar in construction and mode of operation to the third embodiment except that not only are the red, green and blue light-emitting diodes 3, 3' and 3'' turned on individually and independently but also they are turned on simultaneously or in combination so that some of the target may be displayed by the additive colors depending upon the target intensity.

The three light-emitting diodes 3, 3' and 3'' are mounted upon the rotary disk 2 in closely spaced apart relation in the form of a triangle, and the lens 20 is located in front of them in order to facilitate the observation of the additive colors.

The output of the receiver 9 is applied to a matrix circuit 24 so that it may be divided, in response to the target intensity, into the signals applied through amplifiers 25, 26, and 27, respectively, to the red, green, and blue light-emitting diodes so as to turn them independently and into the combinations thereof so as to turn on any two or all of the three light-emitting diodes. Matrix circuit 24 is constructed in the same manner as the amplifier, limiter, and clipper circuits of FIGS. 3 and 7. Therefore, the viewer may observe the red, green, blue, and additive colors thereof depending upon the target intensity.

What is claimed is:

1. A color display device for a fish detection sonar comprising a sonar transmitter, a sonar receiver, and a sonar transducer, said display device comprising
    a. target intensity detecting means for detecting from the output of said receiver whether the target intensity of each target is higher or lower than one of a plurality of predetermined intensity levels, thereby detecting whether each target is within predetermined intensity level ranges,
    b. a rotary disk driven by driving means in synchronism with the transmission of sound by said transducer,
    c. a transparent, fixed scale disk with graduated scales disposed coaxially of and in opposed relation with said rotary disk, and
    d. at least two display elements each capable of emitting light in a different color when energized and disposed upon said rotary disk in closely spaced apart relation, means electrically coupling said display elements to said target intensity detecting means for energizing each display element when the target intensity of each target is within an intensity level range assigned to said each display element, whereby the targets may be displayed in different colors depending on the target intensity thereof.

2. A color display device as defined in claim 1 wherein two display elements capable of emitting light in different colors are used; and wherein said electrical coupling means comprises means for energizing one of said display elements in response to a signal higher than a predetermined higher reference level; means for energizing the other display element, in response to a signal lower than a predetermined lower reference level; and means for energizing both, in response to a signal higher than said lower reference level but lower than said higher reference level.

3. A color display device as defined in claim 2 wherein a lens is located in front of said two display elements so that the additive color thereof may be observed through said lens.

4. A color display device as defined in claim 1 wherein three display elements capable of emitting red, green and blue light are used, and wherein said electrical coupling means comprises means for energizing said red, green and blue lights independently and in combination in response to the output of said signal level detecting means.

5. A color display device as defined in claim 4 wherein a lens is located in front of said three display elements so that the additive color thereof may be observed through said lens.

6. A color display device as defined in claim 1 wherein a plurality of display elements each capable of emitting a different color are used, and wherein said electrical coupling means comprises means for energizing said display elements independently and in combination in response to the output of said signal level detecting means.

7. In an echo signal detection and display apparatus having a sonar transmitter, a sonar transducer coupled to said transmitter for emitting sound waves, a sonar receiver coupled to said transducer for receiving signals corresponding to sound waves received by said transducer, and a display device coupled to said receiver, wherein said display device comprises a first light emitting device mounted for rotation, whereby the angular position at which said light emitting device is energized by said receiver is dependent upon the distance between said transducer and a sound reflecting objects; the improvement comprising a second light emitting device mounted for rotation with and closely adjacent said first light emitting device, said second light emitting device emitting a different color of light than said first light emitting device, and wherein said receiver comprises means responsive to signals from said transducer for energizing said first light emitting device, and means responsive only to signals greater than a first finite minimum intensity for energizing said second light emitting device.

8. The apparatus of claim 7 wherein said receiver further comprises means responsive to intensities of signals greater than a second finite minimum intensity for inhibiting energization of said first light emitting device.

9. The apparatus of claim 8 wherein said first and second finite minimum intensities are the same, whereby said first and second light emitting devices are energized only in response to signals of separate intensity ranges.

10. The apparatus of claim 8 wherein said second minimum intensity is greater than said first minimum intensity, whereby said first and second light emitting devices are energized in response to signals in an intensity range between said first and second minimum intensities.

* * * * *